United States Patent
Sakalowsky et al.

(10) Patent No.: US 9,201,577 B2
(45) Date of Patent: Dec. 1, 2015

(54) USER INTERFACES FOR CONTROLLING AUDIO PLAYBACK DEVICES AND RELATED SYSTEMS AND DEVICES

(71) Applicant: Bose Corporation, Framingham, MA (US)

(72) Inventors: John Michael Sakalowsky, West Newton, MA (US); Joel H. Miller, Westborough, MA (US)

(73) Assignee: Bose Corporation, Framingham, MA (US)

( * ) Notice: Subject to any disclaimer, the term of this patent is extended or adjusted under 35 U.S.C. 154(b) by 233 days.

(21) Appl. No.: 14/023,085

(22) Filed: Sep. 10, 2013

(65) Prior Publication Data

US 2015/0074528 A1 Mar. 12, 2015

(51) Int. Cl.
  *G06F 3/048* (2013.01)
  *G06F 3/0484* (2013.01)
  *G06F 3/0482* (2013.01)
  *G06F 3/0488* (2013.01)

(52) U.S. Cl.
  CPC ............ *G06F 3/04842* (2013.01); *G06F 3/048* (2013.01); *G06F 3/0482* (2013.01); *G06F 3/0488* (2013.01)

(58) Field of Classification Search
  CPC .................................................... G06F 3/0482
  USPC ................................................ 715/716, 810
  See application file for complete search history.

(56) References Cited

U.S. PATENT DOCUMENTS

| | | | |
|---|---|---|---|
| 8,111,132 B2 | 2/2012 | Allen et al. | |
| 8,819,552 B2* | 8/2014 | Park et al. | 715/716 |
| 2005/0114374 A1 | 5/2005 | Juszkiewicz et al. | |
| 2008/0034081 A1* | 2/2008 | Marshall et al. | 709/223 |
| 2008/0257134 A1* | 10/2008 | Oppenheimer | 84/609 |
| 2009/0056525 A1* | 3/2009 | Oppenheimber | 84/609 |
| 2010/0085208 A1 | 4/2010 | Murakoshi | |
| 2011/0047472 A1* | 2/2011 | West et al. | 715/740 |
| 2012/0257025 A1* | 10/2012 | Kim et al. | 348/51 |
| 2013/0179795 A1* | 7/2013 | Yamashita | 715/740 |
| 2014/0019872 A1* | 1/2014 | Yun | 715/744 |
| 2015/0040065 A1* | 2/2015 | Bianco et al. | 715/810 |

FOREIGN PATENT DOCUMENTS

WO 2011057076 A1 5/2011

OTHER PUBLICATIONS

International Search Report and Written Opinion dated Jan. 21, 2015 for International application No. PCT/US2014/054759.
Anonymous: "SoundTouch controller—Quick Start Guide", Oct. 16, 2013, XP055160a02, Retrieved from the Internet: URL:http://web.archive.org/web/20140902015704/http://worldwide.bose.com/library/assets/pdf/guides/soundtouch_controller/owg_multi_soundtouch_controller.pdf [retrieved on Jan. 9, 2015].

* cited by examiner

Primary Examiner — William Titcomb

(57) ABSTRACT

A user interface (e.g., on remote control device) for controlling an audio playback device. The user interface includes an input region operable to select from a plurality of entities for providing audio content to the audio playback device, and a display for displaying information associated with the entities. The user interface is configured to allow a user to preview the information associated with the entities via the display prior to selection of one of the entities for providing audio content for playback on the audio playback device.

25 Claims, 11 Drawing Sheets

USER INTERFACES FOR CONTROLLING AUDIO PLAYBACK DEVICES AND RELATED SYSTEMS AND DEVICES

BACKGROUND

This disclosure relates to user interfaces for controlling audio playback devices and related systems and devices.

SUMMARY

This disclosure is based, in part, on the realization that a user interface can be provided with a preview feature that allows a user to browse available entities (e.g., Internet radio stations, user defined playlists of audio content) prior to selection of one of the entities for providing audio content to a console (e.g., an audio playback device) associated with the user interface.

The preview feature can allow the user to make an informed selection from the available entities, which can help to provide for a more efficient and enjoyable user experience.

One aspect features a user interface for controlling an audio playback device. The user interface includes an input region operable to select from a plurality of entities for providing audio content to the audio playback device, and a display for displaying information associated with the entities. The user interface is configured to allow a user to preview the information associated with the entities via the display prior to selection of one of the entities for providing audio content for playback on the audio playback device.

Implementations may include one of the following features, or any combination thereof.

In some implementations, the information associated with the entities includes an identification of an audio source associated with a corresponding one of the entities, and metadata associated with the corresponding one of the entities.

In certain implementations, the identification of the audio source comprises an icon associated with the audio source.

In some implementations, the input region comprises a finger position sensor for sensing a position of a user's finger on a surface of the input region.

In certain implementations, the user interface also includes a switch and the input region is displaceable to actuate the switch.

In some implementations, the user interface is configured to interpret input from the finger position sensor indicating a position of a user's finger relative to the input region as a user request to preview information regarding one of the entities in the absence of input indicating actuation of the switch. The user interface is configured to interpret input from the finger position sensor indicating a position of a user's finger relative to the input region in combination with input indicating actuation of the switch as selection of one of the entities to provide audio content to the audio playback device.

In certain implementations, in response to receiving input from the finger position sensor indicating a position of a user's finger relative to the input region in combination with input indicating actuation of the switch, a remote control device that includes the user interface is configured to instruct the audio playback device to play content from a selected one of the entities.

In some implementations, the input region operates as an absolute location of a plurality of preset indicators, wherein each indicator in the set of preset indicators is assigned to it one of the entities.

In some implementations, the user interface is configured to interpret input from the finger position sensor indicating a position of a user's finger relative to a first one of the preset indicators as a user request to preview information associated with the entity assigned to the first one of the preset indicators in the absence of input indicating actuation of the switch, and the user interface is configured to interpret input from the finger position sensor indicating a position of a user's finger relative to the first one of the preset indicators in combination with input indicating actuation of the switch as selection of the entity assigned to the first one of the preset indicators to provide audio content to the audio playback device.

In certain implementations, in response to receiving input from the finger position sensor indicating a position of a user's finger relative to the first one of the preset indicators in combination with input indicating actuation of the switch, a remote control device that includes the user interface is configured to instruct the audio playback device to play content from the entity assigned to the first one of the preset indicators.

In some implementations, a swiping motion along the input region allows a user to preview a recents list, wherein the recents list comprises a list of entities that is populated from content that the user has chosen to play on the audio playback device.

In certain implementations, the user interface includes a switch and the input region is displaceable to actuate the switch. The user interface is configured to interpret input from the finger position sensor indicating a position of a user's finger relative to the input region as a user request to preview information regarding one of the entities from the recents list in the absence of input indicating actuation of the switch, and the user interface is configured to interpret input from the finger position sensor indication a position of a user's finger relative to the input region in combination with input from the finger position sensor as selection of one of the entities from the recent list.

In some implementations, the user interface is operable in a presets mode and a recents mode. When the user interface is in the presets mode, the input region operates as an absolute location of a plurality of preset indicators, which correspond to a set of preset indicators on the audio playback device, each indicator in the set of preset indicators is configured to have assigned to it one of the entities, and a user can preview information associated with an assigned one of the entities via the display by touching a corresponding one of the preset indicators. When the user interface is in the recents mode, a swiping motion along the input region allows a user to preview a recents list, wherein the recents list is a list of entities that is populated from content that the user has chosen to play on the audio playback device.

In certain implementations, the entities include at least (i) user-defined playlists of digital music and (ii) Internet radio stations.

Another aspect provides a remote control device for controlling an audio playback device. The remote control device includes a user interface that has an input region that is operable to select from a plurality of entities for providing audio content to the audio playback device, and a display for displaying information associated with the entities. The user interface is configured to allow a user to preview the information associated with the entities via the display prior to selection of one of the entities for providing audio content for playback on the audio playback device.

Implementations may include one of the above and/or below features, or any combination thereof.

In some implementations, the input region operates to as an absolute location of a plurality of preset indicators. Each indicator in the set of preset indicators has assigned to it one of the entities. The preset indicators on the remote control device correspond to a set of preset indicators on the audio playback device.

Yet another aspect features an audio playback device that includes a user interface. The user interface includes an input region that is operable to select from a plurality of entities for providing audio content to the audio playback device, and a display for displaying information associated with the entities. The user interface is configured to allow a user to preview the information associated with the entities via the display prior to selection of one of the entities for providing audio content for playback on the audio playback device.

In some implementations, the remote control device is not configured to stream audio content to the audio playback device.

According to another aspect, a system includes an audio playback device and a remote control device for controlling the audio playback device. The remote control device includes a user interface having an input region operable to select from a plurality of entities for providing audio content to the audio playback device, and a display for displaying information associated with the entities. The remote control device is configured to allow a user to preview the information associated with the entities via the display prior to selection of one of the entities for providing audio content for playback on the audio playback device. The audio playback device includes a digital-to-analog converter configured to receive a digital representation of content from the digital audio sources and convert to analog form, and an electro-acoustic transducer. The remote control device is configured to send a command to the audio playback device instructing the associated audio playback device to render audio content from a selected one of the entities, and, in response to receiving the command from the remote control device, the audio playback device is configured to establish communication with an audio source associated with the selected one of the entities, to receive streamed audio content from the selected one of the entities.

Implementations may include one of the above and/or below features, or any combination thereof.

In some implementations, the input region operates as an absolute location of a plurality of preset indicators. Each indicator in the set of preset indicators is assigned to it one of the entities.

In certain implementations, the audio playback device includes a plurality of preset indicators. Each indicator in the set of preset indicators of the audio playback device is assigned to it one of the entities, and the preset indicators on the remote control device correspond to the preset indicators on the audio playback device.

In some implementations, the preset indicators of the remote control device are disposed circumferentially around the display.

Yet another aspect provides a user interface for controlling an audio playback device. The user interface that includes a plurality of concentrically arranged user interface elements. The user interface elements include a center button including a display, an inner ring circumferentially surrounding the center button and operable to select from a plurality of entities for providing audio content to the audio playback device, a middle ring circumferentially surrounding the inner ring and comprising a plurality of discrete buttons, and a volume ring circumferentially surrounding the middle ring and operable to adjust the audio volume of the audio playback device. The user interface is configured to allow a user to preview the information associated with the entities via the display prior to selection of one of the entities for providing audio content for playback on the audio playback device.

Implementations may include one of the above and/or below features, or any combination thereof.

In some implementations, the plurality of discrete buttons include a plurality of capacitive touch buttons.

In certain implementations, the plurality of discrete buttons include a skip forward button and a skip back button.

In some implementations, the inner ring includes a finger position sensor for sensing a position of a user's finger on a surface of the ring.

In certain implementations, the finger position sensor includes a capacitive touch circuit.

In some implementations, the center button is displaceable to actuate a switch, and the user interface is configured to interpret input from the finger position sensor indicating a position of a user's finger relative to the inner ring as a user request to preview information regarding one of the entities in the absence of input indicating actuation of the switch. The user interface is configured to interpret input from the finger position sensor indicating a position of a user's finger relative to the inner ring in combination with input indicating actuation of the switch as selection of one of the entities to provide audio content to the audio playback device.

In certain implementations, in response to receiving input from the finger position sensor indicating a position of a user's finger relative to the inner ring in combination with input indicating actuation of the switch, a remote control device that includes the user interface is configured to instruct the audio playback device to play content from a selected one of the entities.

All examples and features mentioned above can be combined in any technically possible way. Other features and advantages will be apparent from the description and the claims.

DETAILED DESCRIPTION

System Overview

Figure 1:
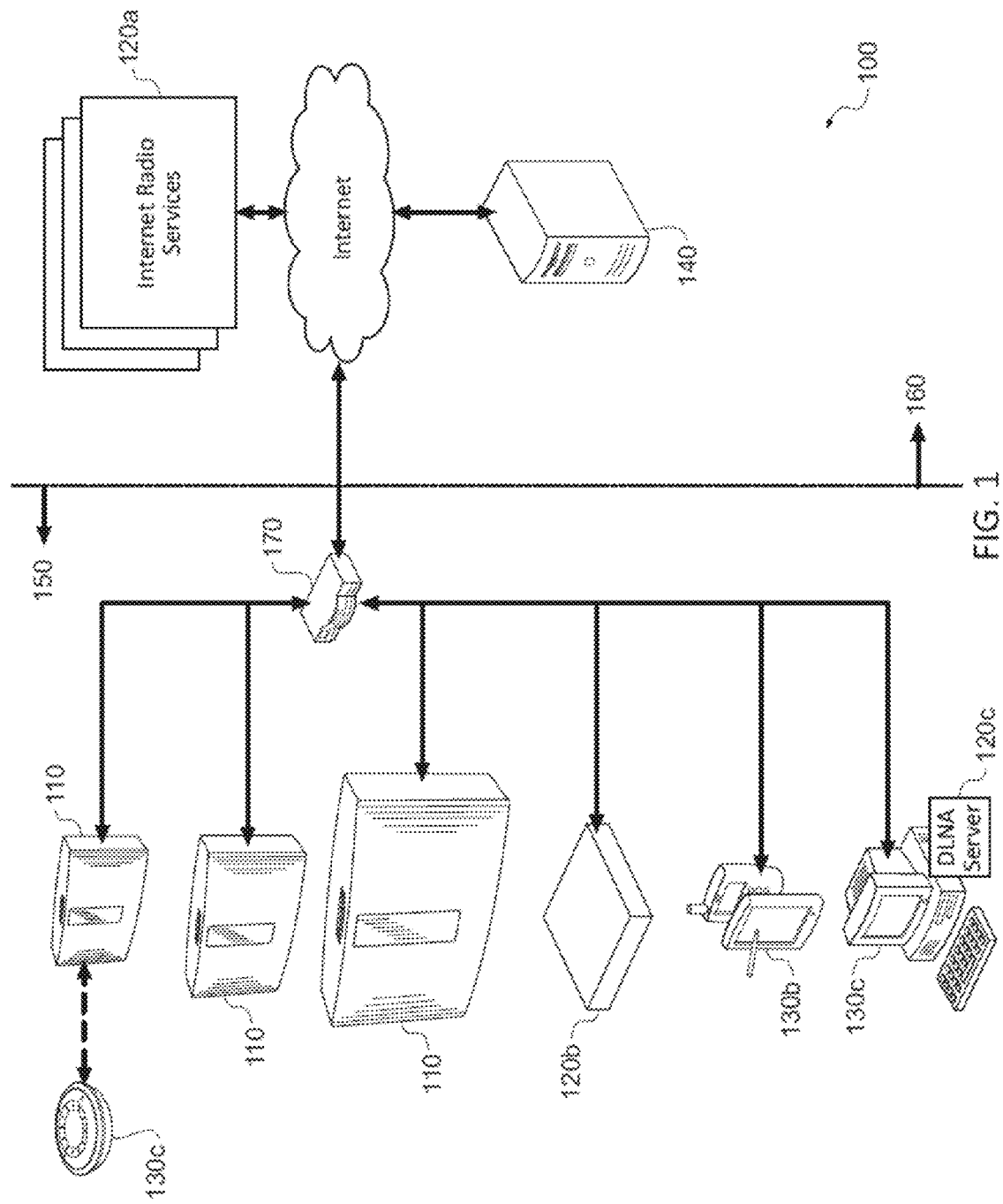
FIG. 1 is a schematic view of an audio system that facilitates synchronization of presets among various system devices.

Referring to FIG. 1, an audio system 100 for the delivery of digital audio (e.g., digital music) provides for easy, quick access to a variety of digital audio sources through the use of preset assignments. At a very high level, there are four main categories of devices in the audio system 100: (i) audio playback devices 110; (ii) digital audio sources 120*a*, 120*b*, 120*c* (collectively referenced as 120); controllers 130*a*, 130*b*, 130*c* (collectively referenced as 130); and a server 140.

The audio playback devices 110 are electronic devices which are capable of rendering audio content. These devices can access stored audio content (e.g., remotely stored audio content) and stream it for playback. In some cases, the audio playback devices 110 may also be capable of playing locally stored content. These devices render audio with the help of audio codecs and digital signal processors (DPSs) available within. The audio playback devices 110 may include wireless speaker packages, Wi-Fi enabled televisions, home theater systems (e.g., with built-in Wi-Fi), etc.

The audio playback devices 110 can communicate with each other. For example, each audio playback device 100 can communicate with the other audio playback devices 110 within the audio system 100 for synchronization. This can be a synchronization of device settings, such as synchronization of preset assignments, or, for synchronization of playback (e.g., such that all or a subset of the audio playback devices 110 play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "Entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 120 is an Internet music service such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to an audio playback device 110. Typically, there are two models for this data movement, push and pull. The audio system 100 is capable of managing this audio (data) streaming in both fashions; descriptions of these processes are as follows.

In a push model, the digital audio source 120 will move the data to the audio playback device 110 at a pace that it desires. The recipient (e.g., one of the audio playback devices 110) of the data will acknowledge the data and the digital audio source 120 will provide more data. This model requires the digital audio source 120 to be managing the throughput characteristics of the audio system 100. In a pull model, the audio playback device 110 will request data from the digital audio source 120 at a rate it desires. This allows the audio playback device 110 to read ahead if data is available.

The digital audio sources 120 each maintain a repository of audio content which can be chosen by the user to play. The digital audio sources 120 are based on the Digital Living Network Alliance® (DLNA) or other Web based protocols similar to the Hypertext Transfer Protocol (HTTP). Some of the devices and services in this category include Internet based music services 120*a* such as Pandora®, Spotify®, and vTuner®; network-attached storage (NAS) devices 120*b*, and a media server daemon 120*c* (e.g., provided as a component of a computer-based controller).

The digital audio sources 120 include user defined playlists of digital music files available from network audio sources such as network-attached storage (NAS) devices 120*b*, and a DLNA server 120*c* which may be accessible to the audio playback devices 110 over a local area network such as a wireless (Wi-Fi) or wired (Ethernet) home network 150, as well as Internet radio sites 120*a* such as Pandora®, vTuner®, Spotify®, etc., which are accessible to the audio playback devices 110 over a wide area network 160 such as the Internet.

The controllers 130 are responsible for controlling the audio playback devices 110 and for browsing the audio sources 120 in the audio system 100. Some of the devices in this category include desktop computers, laptop computers, and mobile devices such as smart phones and tablets. These devices control the audio playback devices 110 via a wireless communication interface (e.g., IEEE 802.11 b/g, Bluetooth LE, infrared, etc.). The controllers 130 serve as an online management tool for a user's network enabled audio playback devices 110. The controllers 130 provide interfaces which enable to the user to perform one or more of the following: setup a connection to a Wi-Fi network; create an audio system account for the user, sign into a user's audio system account and retrieve information; add or remove an audio playback device 110 on a user's audio system account; edit an audio playback device's name, and update software; access the audio sources (via the audio playback devices 110); assign an entity (e.g., a playlist or radio station) associated with one of the audio sources 120 to a preset indicator; browse and select recents, where "recents" refers to recently accessed entities; use transport controls (play/pause, next/skip, previous), view "Now Playing" (i.e., content currently playing on an audio playback device 110) and album art; and adjust volume levels.

In some cases, the controllers 130 may include network controllers 130*a*, 130*b* and auxiliary controllers 130*c* (also referred to as remote control devices 130*c*). The network controllers 130*a*, 130*b* are controllers that communicate with the audio playback devices 110 over a wireless (Wi-Fi) network connection. The network controllers can include primary network controllers 130*a* and secondary network controllers 130*b*. The primary network controllers 130*a* can be utilized for: connecting an audio playback device 110 to a Wi-Fi network (via a USB connection between the audio playback device 110 and the primary network controller 130*a*); creating a system account for the user; setting up music services; browsing of content for playback; setting preset assignments on the audio playback devices 110; transport control (e.g., play/pause, fast forward/rewind, etc.) for the audio playback devices 110; and selecting audio playback devices 110 for content playback (e.g., single room playback or synchronized multi-room playback). Devices in the primary network controller category can include desktop and laptop computers.

The secondary network controllers 130*b* may offer some, but not all, of the functions of the primary network controllers 130*a*. For example, the secondary network controllers 130*b* may not provide for all of the account setup and account management functions that are offered by the primary network controllers 130*a*. The secondary network controllers 130*b* may be used for: music services setup; browsing of content; setting preset assignments on the audio playback devices; transport control of the audio playback devices; and selecting audio playback devices 110 for content playback: single room or synchronized multi-room playback. Devices in the secondary network controller category can include mobile devices such as smart phones and tablets.

The auxiliary controllers 130*c* (a/k/a "remote control devices 130*c*") communicate wirelessly (e.g., via Bluetooth low energy (BTLE) or IR) with an associated (e.g., paired) one of the audio playback devices (item 110, FIG. 1). The auxiliary controllers 130c may offer limited functionality. The auxiliary controllers 130c may be used for: browsing of content; setting of preset assignments on the associated one of the audio playback devices 110; selecting of one of the preset assignments on the associated one of the audio playback devices 110; and transport control (play/pause, skip forward, skip back, etc.) of the associated audio playback device 110.

The server 140 is a cloud-based server which contains (e.g., within an account database) information related to a user's audio system account. This includes user account information such as the list of the audio playback devices 110 within the system 100, device diagnostic information, preset assignments, etc. The server 140 will be connected to by the audio playback devices 140 and by the controllers 130 (e.g., by primary network controllers) for the purpose of preset management, as well as management of audio sources 120 and management of the user's audio system account. Generally, the controllers 130 (e.g., network controllers 130a, 130b) will login to the server 140 with a user's login details and 'sync down' the required information to work with.

The audio playback devices 110 and one or more of the controllers 130 are coupled to a local area network (LAN) 150. Other devices such as one or more of the digital audio sources (e.g., a network-attached storage (NAS) device 120b) may also be coupled to the LAN 150. The LAN 150 may be a wired network, a wireless network, or a combination thereof. In one example, the devices (e.g., audio playback devices 110 and controllers 130 (e.g., primary and secondary controllers 130a, 130b)) within the LAN 150 are wirelessly coupled to the LAN 150 based on an industry standard such as IEEE 802.11 b/g. The LAN 150 may represent a network within a home, an office, or a vehicle. In the case of a residential home, the audio playback devices 110 may be arranged in different rooms (e.g., kitchen, dining room, basement, etc.) within the home. The devices within the LAN 150 connect to a user supplied access point 170 (e.g., a router) and subsequently to a wide area network (WAN) 160 (e.g., the Internet) for communication with the other digital audio sources 120 (Internet based music services 120a) and the server 140. In some cases, the LAN 150 may comprise plural LANs in different locations each including one or more of the audio playback devices 110 and each in communication with the wide area network.

Notably, the audio system 100 can provide for the management of presets (a/k/a "preset assignments") and recents. Presets are a set of (e.g., six) user-defined shortcuts to content, intended to provide quick access to entities associated with the digital music sources 120 from (1 of 6) preset indicators present on each of the audio playback devices 110. In some cases, the preset indicators can be hardware buttons. Alternatively, the preset indicators may be virtual buttons defined by regions on a touch sensitive display. The individual preset indicators can be denoted with numerical identifiers.

The preset indicators on the audio playback devices 110 provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account based audio sources which normally require a user to login with account credentials.

The presets can be global or local at the user's option. The user can select the global or local option, e.g., during set up of the user's system account. If the user's account is set to provide for global presets, the preset assignments will be synchronized on all the audio playback devices 110 across the audio system 100 such that preset assignments on any one of the audio playback devices correspond to respective preset assignments on each of the other audio playback devices (e.g., such that preset indicator "1" on a first one of the audio playback devices is assigned to the same entity as preset indicator "1" on all of the other audio playback devices 110 in the audio system 100), and, such that, if one of the preset assignments is changed on one of the audio playback devices 110, each of the other audio playback devices 110 is automatically updated such that a corresponding change is made to a corresponding preset assignment on each of the other audio playback devices. The synchronization of the preset assignments is managed through a combination of communications between the audio playback devices 110 with the server 140, and communications among the audio playback devices 110 themselves. A copy of the global preset assignments is stored locally on each audio playback device 110 associated with the user's account, and a copy of the global preset assignments is also maintained on the server 140.

The "recents" (a/k/a "recents list") is a list of entities that is populated from content that the user has chosen to play. Recent entities can include Internet radio stations (e.g., for Pandora® and vTuner®), and a "group of tracks" selected for Spotify® and stored music. The "group of tracks" is a "parent" of a currently playing track, based on whatever the user either browsed to or searched for (e.g., Album, Playlist, Genre>All, Artist>All, etc.). The controllers 130, and, in some cases, the audio playback devices 110, can provide access to the recents by displaying the recents list to the user and allowing the user to browse the recents list and select entities therefrom.

The recents can be limited to a predetermined number of entities (e.g., 50-100 entities). Alternatively or additionally, the recents may be limited by date. For example, the recents may be limited to entities accessed by the user within the last day, month, year, etc., with older entries being purged from the list.

As with the presets, the recents can be global (applied to all audio playback devices associated with a user's account) or local (device-specific) at the user's option. The same local/global toggle can be leveraged for both the presets and the recents. That is, one "global/local" setting can dictate whether the presets and recents are global or local. In some cases, the default setting is "global." Additional details regarding the management of presets and recents are disclosed in U.S. application Ser. No. 13/833,394, filed Mar. 15, 2013, which is incorporated herein by reference in its entirety.

Audio Playback Devices

Figure 2A:
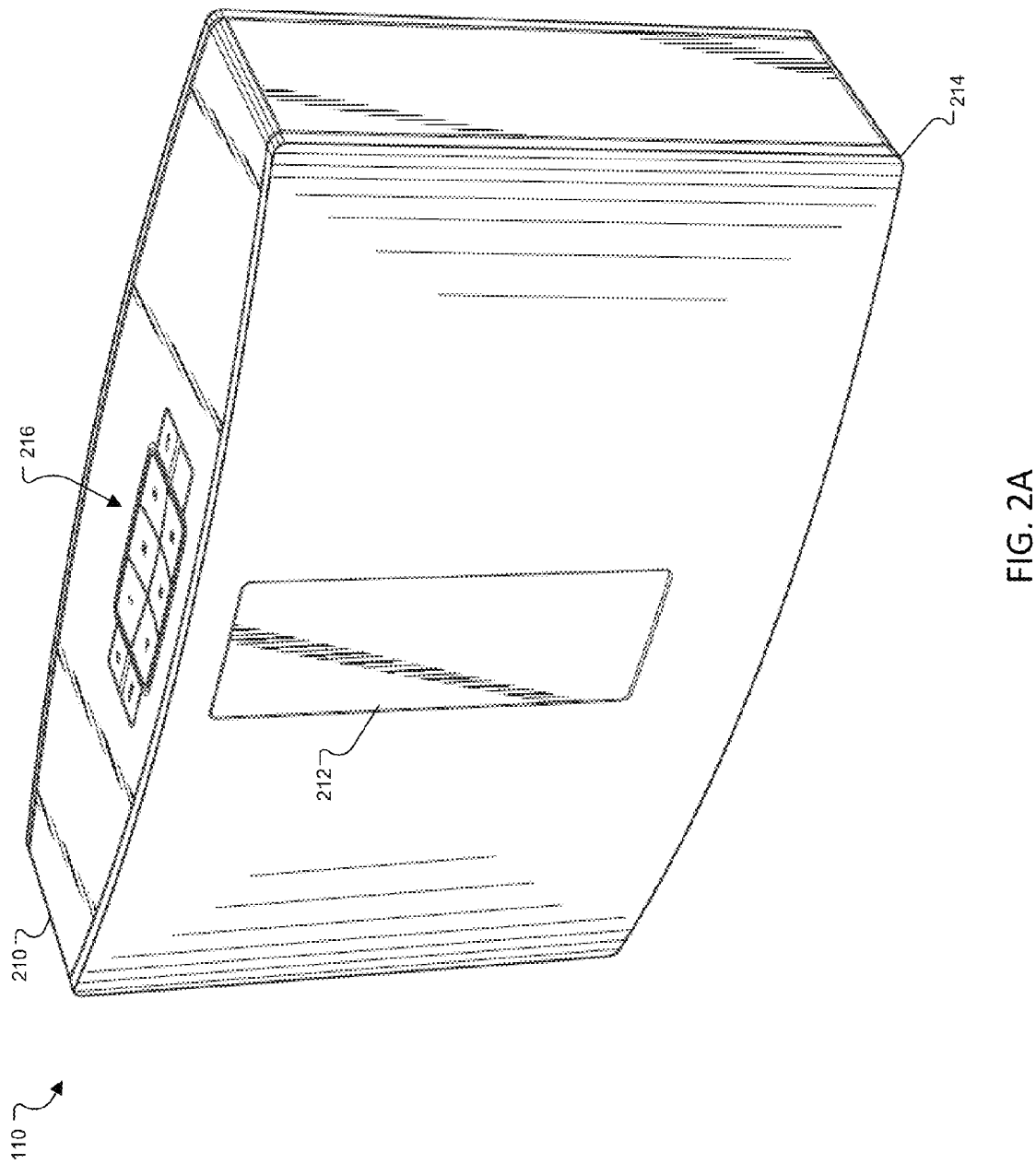
FIGS. 2A and 2B are perspective and top plan views, respectively, of an exemplary audio playback device from the audio system of FIG. 1.
Figure 2B:
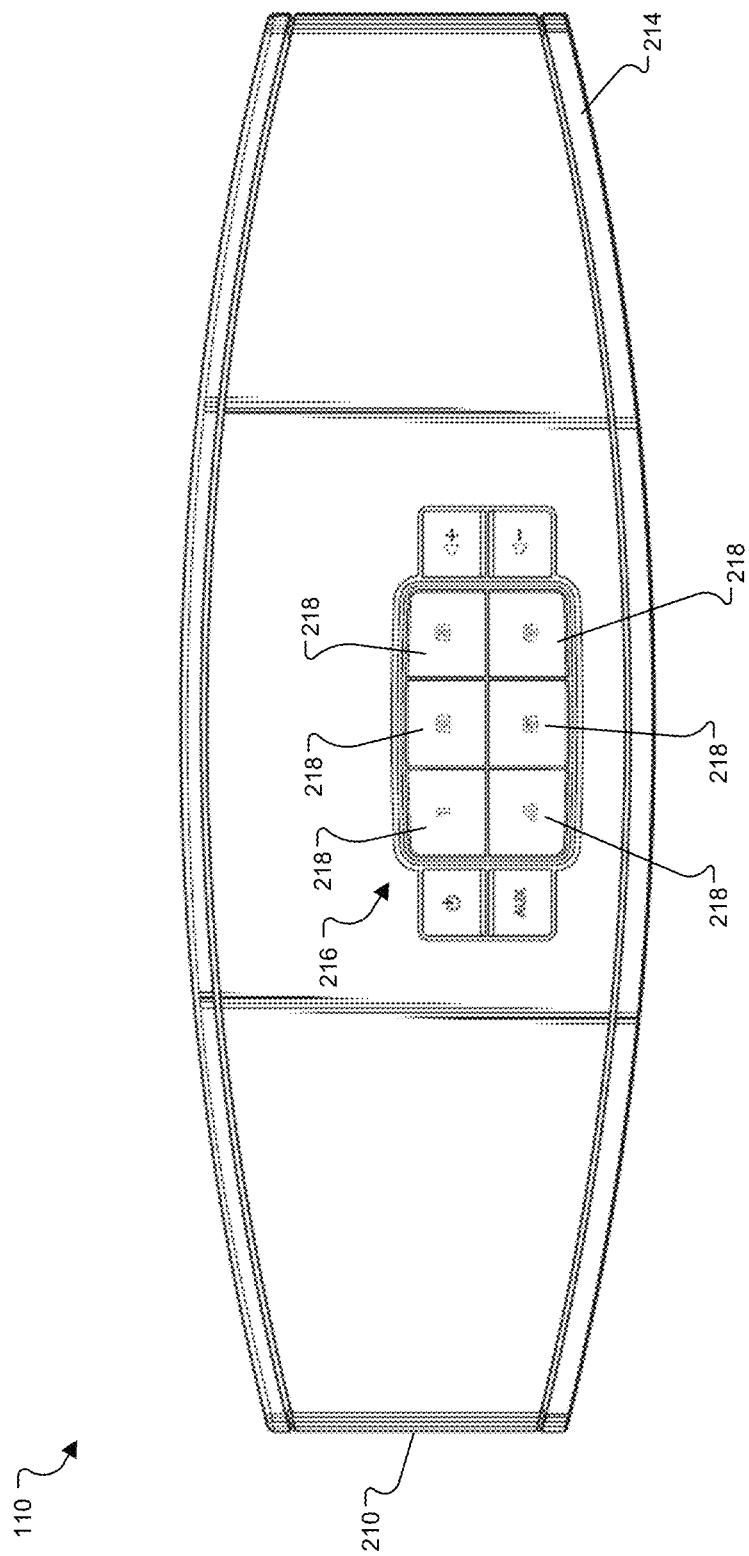
Figure 2C:
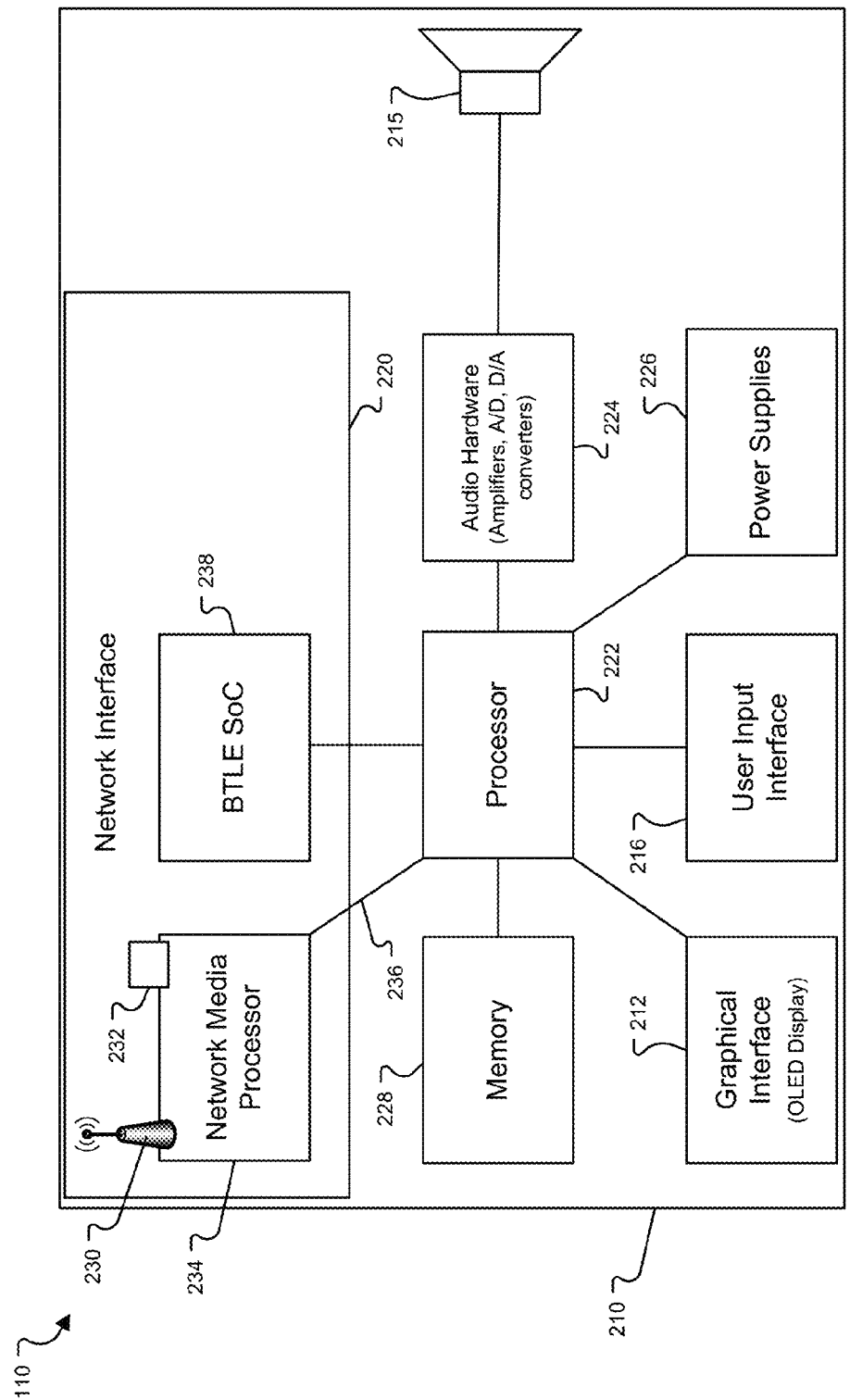
FIG. 2C is a block diagram of the audio playback device of FIG. 2A.

An exemplary audio playback device 110 will now be described in greater detail with reference to FIGS. 2A through 2C. Referring to FIG. 2A, an audio playback device 110 includes an enclosure 210 and on the enclosure 210 there resides a graphical interface 212 (e.g., an OLED display) which can provide the user with information regarding currently playing ("Now Playing") music and information regarding the presets. A screen 214 conceals one or more electro-acoustic transducers 215 (FIG. 2C). The audio playback device 110 also includes a user input interface 216. As shown in FIG. 2B, the user input interface 216 includes a plurality of preset indicators 218, which are hardware buttons in the illustrated example. The preset indicators 218 (numbered 1-6) provide the user with easy, one press access to entities assigned to those buttons. That is, a single press of a selected one of the preset indicators 218 will initiate streaming and rendering of content from the assigned entity.

The assigned entities can be associated with different ones of the digital audio sources (items 120a, 120b, 120c, FIG. 1) such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 218 operate in the same manner, at least from the user's perspective, regardless of which entities are assigned and which of the digital audio sources provide the assigned entities. That is, each preset indicator 218 can provide for single press access to its assigned entity whether that entity is a user-defined playlist of digital music provided by an NAS device or an Internet radio station provided by an Internet music service.

With reference to FIG. 2C, the audio playback device 110 also includes a network interface 220, a processor 222, audio hardware 224, power supplies 226 for powering the various audio playback device components, and memory 228. Each of the processor 222, the graphical interface 212, the network interface 220, the processor 222, the audio hardware 224, the power supplies 226, and the memory 228 are interconnected using various buses, and several of the components may be mounted on a common motherboard or in other manners as appropriate.

The network interface 220 provides for communication between the audio playback device 110 and the controller (e.g., items 130a-c, FIG. 1), the server (item 140, FIG. 1), the audio sources (items 120, FIG. 1) and other audio playback devices 110 via one or more communications protocols. The network interface 220 may provide either or both of a wireless interface 230 and a wired interface 232. The wireless interface 230 allows the audio playback device 110 to communicate wirelessly with other devices in accordance with a communication protocol such as such as IEEE 802.11 b/g. The wired interface 232 provides network interface functions via a wired (e.g., Ethernet) connection.

In some cases, the network interface 220 may also include a network media processor 234 for supporting Apple Air-Play® (a proprietary protocol stack/suite developed by Apple Inc., with headquarters in Cupertino, California, that allows wireless streaming of audio, video, and photos, together with related metadata between devices). A suitable network media processor is the DM870 processor available from SMSC of Hauppauge, N.Y. The network media processor 234 provides network access (i.e., the Wi-Fi network and/or Ethernet connection can be provided through the network media processor 234) and AirPlay® audio. AirPlay® audio signals are passed to the processor 222, using the I²S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device. In some cases, one of the preset indicators 218 can be assigned an entity in which audio content is streamed via Apple AirPlay®, and another one of the preset indicators 218 on the same device can be assigned to an entity in which audio content is streamed via DLNA's UPnP protocols.

All other digital audio coming from network packets comes straight from the network media processor 234 through a USB bridge 236 to the processor 222 and runs into the decoders, DSP, and eventually is played back (rendered) via the electro-acoustic transducer(s) 215.

The network interface 210 can also include a Bluetooth low energy (BTLE) system-on-chip (SoC) 738 for Bluetooth low energy applications (e.g., for wireless communication with a Bluetooth enabled controller (item 130c, FIG. 1)). A suitable BTLE SoC is the CC2540 available from Texas Instruments, with headquarters in Dallas, Tex.

Streamed data pass from the network interface 220 to the processor 222. The processor 222 can execute instructions within the audio playback device (e.g., for performing, among other things, digital signal processing, decoding, and equalization functions), including instructions stored in the memory 228. The processor 222 may be implemented as a chipset of chips that include separate and multiple analog and digital processors. The processor 222 may provide, for example, for coordination of other components of the audio playback device 110, such as control of user interfaces, applications run by the audio playback device 110. A suitable processor is the DA921 available from Texas Instruments.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for playback. In addition, the audio hardware 224 may include circuitry for processing analog input signals to provide digital audio signals for sharing with other devices in the acoustic system 100.

The memory 228 stores information within the audio playback device 110. In this regard, the memory 228 may store account information, such as the preset and recent information discussed above. The memory 228 may also provide storage for "tokens" for facilitating single press access to the digital audio sources 120 (e.g., the Internet radio services of FIG. 1). A token, as used herein, is a unique identifier that may be provided by the digital audio source 120 and which allows the digital audio source 120 to recognize the audio playback device 110 as being associated with a user's account with the digital audio source 120 and without requiring the user to enter credentials (e.g., user name, password, etc.) each time the audio playback device 110 attempts to access the digital audio source 120.

The memory 228 may include, for example, flash memory and/or non-volatile random access memory (NVRAM). In some implementations, instructions (e.g., software) are stored in an information carrier. The instructions, when executed by one or more processing devices (e.g., the processor 222), perform one or more processes. The instructions can also be stored by one or more storage devices, such as one or more computer- or machine-readable mediums (for example, the memory 228, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130a-c, FIG. 1) serve as graphical remote controls for the audio playback devices 110 and do not communicate with the digital audio sources 120 (FIG. 1) directly, but, instead, communicate with the digital audio sources 120 via the audio playback devices 110.

Controllers

Figure 3:
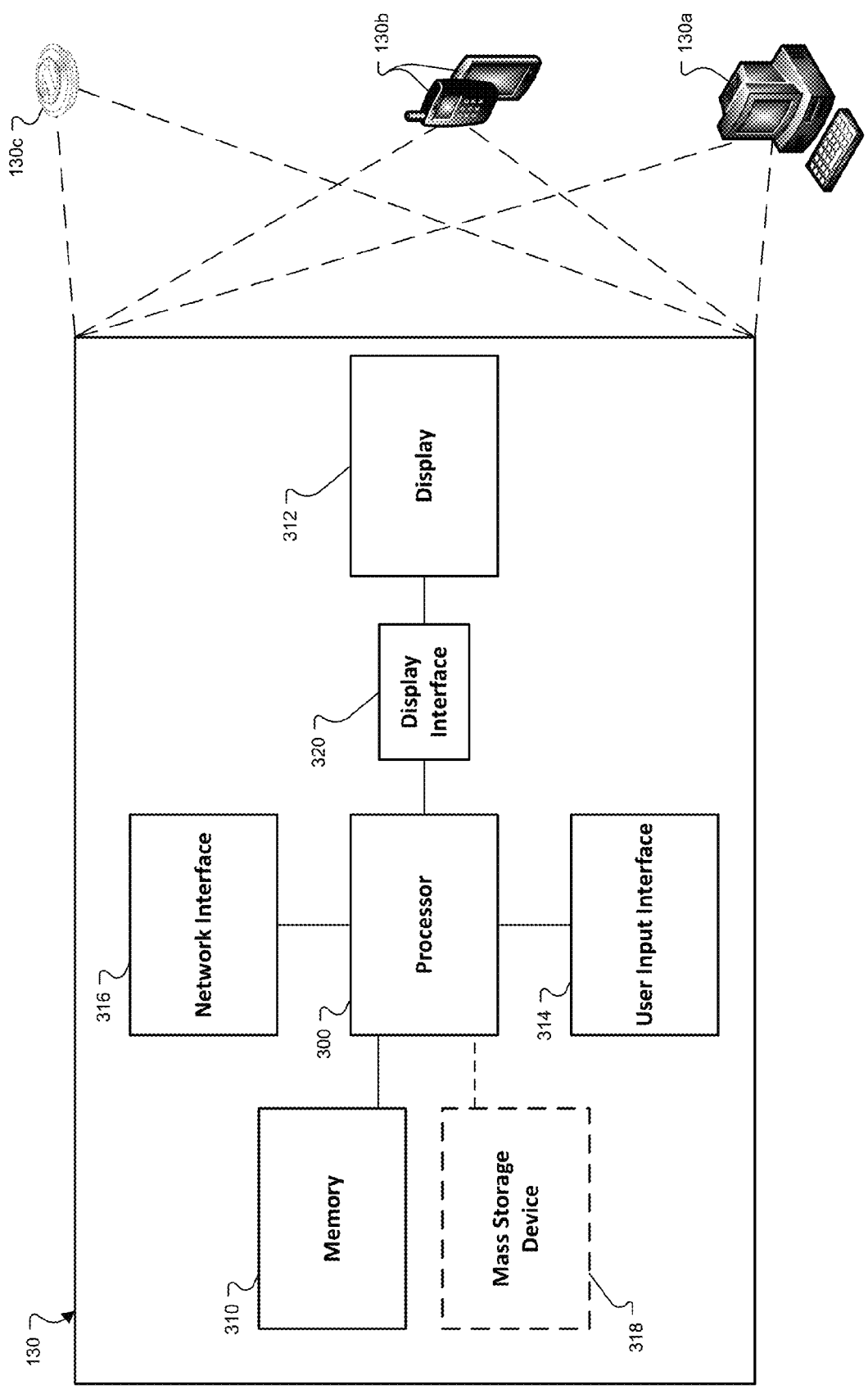
FIG. 3 is a block diagram of an exemplary controller from the audio system of FIG. 1.

Referring to FIG. 3, an exemplary controller 130 includes a processor 300, a memory 310, a display 312, a user input interface 314, and a network interface 316, among other components. The controller 130 may also be provided with a mass storage device 318, such as a hard drive, a micro-drive, or other device, to provide additional storage. Each of the processor 300, the memory 310, the display 312, and the network interface 316 are interconnected using various buses, and several of the components may be mounted on a common motherboard or in other manners as appropriate.

The processor 300 can execute instructions (e.g., software) within the controller 130, including instructions stored in the memory 310 or in a secondary storage device (e.g., mass storage device 318). The processor 300 may be implemented as a chipset of chips that include separate and multiple analog and digital processors. The processor 300 may provide, for example, for coordination of other components of the controller 130, such as control of user interfaces, applications run by the controller 130, and network communication by the controller 130. The processor 300 may communication with a user through the display 312 and the user input interface 314.

The processor 300 may communicate with the user through a display interface 1020 coupled to the display 312. The display 312 may include an LCD monitor, or a touch sensitive display (e.g., in the case of a mobile device). The display interface 1020 may comprise appropriate circuitry for driving the display 312 to preset graphical and other information to the user.

The user input interface 314 may include one or more user input devices such as a keyboard, a pointer device such as a mouse, and/or a touch sensitive display. In some cases, the same device (e.g., a touch sensitive display) may be utilized to provide the functions of the display 312 and the user input interface 314.

The network interface 316 facilitates wireless communication (e.g., Wi-Fi, Bluetooth, IR, etc.) with one or more of the audio playback devices (item 110, FIG. 1) via a corresponding network interface (item 220, FIG. 2C) on the audio playback device 110.

The memory 310 stores information within the controller 130. In some implementations, the memory 310 is a volatile memory unit or units. In some implementations, the memory 310 is a non-volatile memory unit or units. The memory 310 may also be another form of computer-readable medium, such as magnetic or optical disk.

The mass storage device 318 is capable of providing mass storage for the controller 130. In some implementations, the mass storage device 318 may be or contain a computer readable medium, such as a floppy disk device, a hard disk device, an optical disk device, or a tape device, a flash memory or other similar solid state memory device, or an array of devices.

Instructions (e.g., software) can be stored in an information carrier. The instructions, when executed by one or more processing devices (e.g., the processor 300), perform one or more processes. The instructions can also be stored by one or more storage devices such as computer- or machine-readable mediums (for example, the memory 310, the storage device 318, or memory in the processor 300).

Figure 4A:
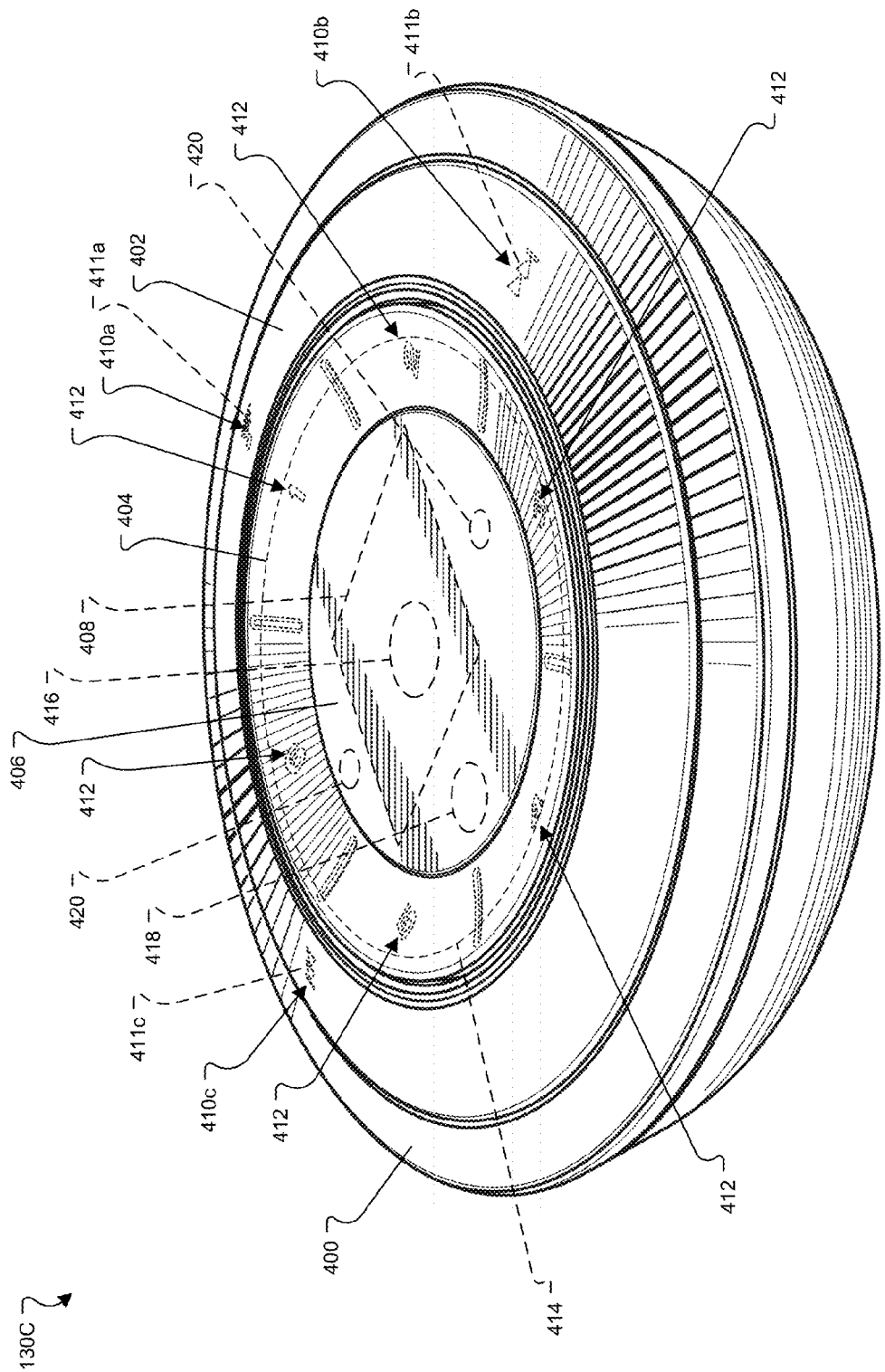
FIG. 4A is a perspective view a remote control device.

FIG. 4A illustrates an exemplary auxiliary controller 130c (as referred to as a "remote control device"). The remote control device 130c can enable the user to initiate a music experience from an associated one of the audio playback devices 110 (FIG. 1), e.g., via Bluetooth LE. Recents and presets that are saved on the associated audio playback device and/or associated with a user's system account are also available on the remote control device 130c. The remote control device 130c allows a user to browse and select recents and presets for providing content for rendering on the associated audio playback device.

The remote control device 130c includes a user interface having a plurality of concentrically arranged user interface elements. In the illustrated implementation, the user interface elements include a volume dial 400 (also referred to as the "volume ring"); a top cover 402; an inner ring 404; a center button 406; and a display 408.

The volume ring 400 can be activated by rotating the volume ring 400 (e.g., clockwise to increase volume and counterclockwise to reduce volume) to adjust the volume of the associated one of the audio playback devices. The top cover 402 includes a plurality of discrete buttons which, in the illustrated example, are implemented as capacitive touch buttons 410a, 410b, 410c (collectively referenced as 410) each with a backlit icon 411a, 411b, 411c (collectively referenced as 411). Alternatively or additionally, the discrete buttons can comprise one or more hardware buttons (e.g., displaceable buttons for actuating associated switches). In the illustrated example, the capacitive touch buttons 410 include a presets/recents modal button 410a, a skip forward button 410b, and a skip back button 410c.

When in presets mode, the inner ring 404 serves as the absolute location of a plurality of preset indicators 412 (six shown), which correspond to the preset indicators on the associated one of the audio playback devices. When in recents mode, a circular swiping motion along the inner ring 404 allows the user to browse the recents (e.g., a recents list provided by the associated audio playback device) via the display 408, and select a recent, for playback on the associated audio playback device, by pressing down on the inner ring 404.

The center button 406 includes a circular lens that masks the display 408. A central push on the center button 406 can power on or pause and unpause the associated audio playback device's audio. A press-and-hold on the center button 406 shuts down the associated audio playback device.

A capacitive touch circuit 414 is positioned beneath the inner ring 404 and is utilized for sensing a position of a user's finger on the inner ring 404. The remote control device 130c also includes a switch 416 (e.g., a snap dome switch) that is positioned beneath the center button 406 and display 408.

In the illustrated example, the inner ring 404 and the center button 406 are integrated in a common assembly an configured such that the switch 416 can be actuated by pressing centrally on the center button 406, or by pressing on the inner ring 404 (e.g., pressing on one of the preset indicators 412). The assembly is configured so that there is enough travel at the preset indicators 412 such that the switch 416 is always being actuated when one of the preset indicators 412 is pressed, and, such that, from a user's perspective, there is not a huge difference between the feel of hitting the center of the center button 406 or the preset indicators 412 along the edges.

The capacitive touch circuit 414 and switch 416 are in communication with the remote control device's processor (see, e.g., item 300, FIG. 3), which executes instructions for interpreting input from the capacitive touch circuit 414 and switch 416. When the user presses down on the inner ring 404, the remote control device 130c will receive input from the capacitive touch circuit 414 indicating the relative position of the user's finger on the inner ring 404 (e.g., which can be used to determine which one of the preset indicators 412 the user is pressing) in combination with input indicating the actuation of the switch 416. The remote control device 130c is configured to interpret actuation of the switch 416 in combination with input from the capacitive touch circuit 414 indicating a position of a user's finger on the inner ring 404 as selection of a preset, if the device is operating in the presets mode; or as selection of a recent, if the device is operating in the recents mode.

A central press on the center button 406 will also actuate the switch 416. The remote control device 130c is configured to interpret actuation of the switch 416, in the absence of input from the capacitive touch circuit 414 indicating a position of a user's finger on the inner ring, as selection of a function associated with the center button 406.

As will be discussed below, the remote control device 130c is also configured to interpret input from the capacitive touch circuit 414 indicating a position of a user's finger relative to the inner ring 404, in the absence of input indicating actuation of the switch 416, as a user request to preview information regarding one of the entities.

The remote control device 130c may also include a proximity detector for detecting the presence of a user's hand near the surface of the remote control device 130c. The proximity detector may include a proximity sensor 418 and a pair of infrared emitters 420 all mounted below the lens. The emitters 420 fire upward through the lens, and, when IR is reflected (e.g., off a user's hand reaching toward the remote control device 130c), the proximity sensor 418 picks that up. The proximity detector can be utilized to allow the remote control device to "wake up" (i.e., power up) from a low power (a/k/a "sleep") mode.

The remote control device 130a may be configured to enter the low power mode after a predetermined period (e.g., 5 seconds to 15 seconds) of non-use. The proximity detector can then be utilized to trigger the remote control device 130c to power up from the low power mode when the presence of the user is detected.

The proximity detector functions such that the remote control device 130c wakes up (i.e., enters a normal power state, e.g., in which the one or functions that were deactivated when entering the low power mode are re-activated) when a user goes to use it without actually having to touch the remote control device 130c; i.e., so that the user's first contact with the remote control device 130c can be used for content (e.g., music) selection. In that regard, the proximity detector can also help to facilitate "one touch" access to music. The idea here is that the user's actions wake the remote control device 130c up from a sleep or low power mode before the user actually contacts the remote control device 130c so that the user can access content (e.g., music) with the user's first touch (e.g., by pressing one of the preset indicators 412, FIG. 4A).

The display 408 can be a 1.6 inch diagonal OLED display and can be identical to the display 212 (FIG. 2A) on the associate audio playback device. The display 408 can show information related to presets, recents, current music playing ("Now Playing" music—music being rendered on the associated audio playback device) and system information. The display 408 can be configured to display substantially the same information as the associate audio playback device. This can help to provide a consistent appearance and user experience across the devices. In some cases, the information can be displayed concurrently on the remote control device and on the associated playback device. Additional details of the remote control device may be found in U.S. patent application Ser. No. 14/023,011, filed concurrently herewith, entitled "User Interfaces and Related Devices and Systems", inventors: Michael Andrew Zalisk et al., the entire contents of which are hereby incorporated by reference.

The remote control device 130c can also be configured to display information in substantially the same format as on the associated audio playback device. The information may include information regarding status of the associated playback device, information about music currently playing on the associated device. The information provided on the display can include text and/or icons.

Figure 4B:
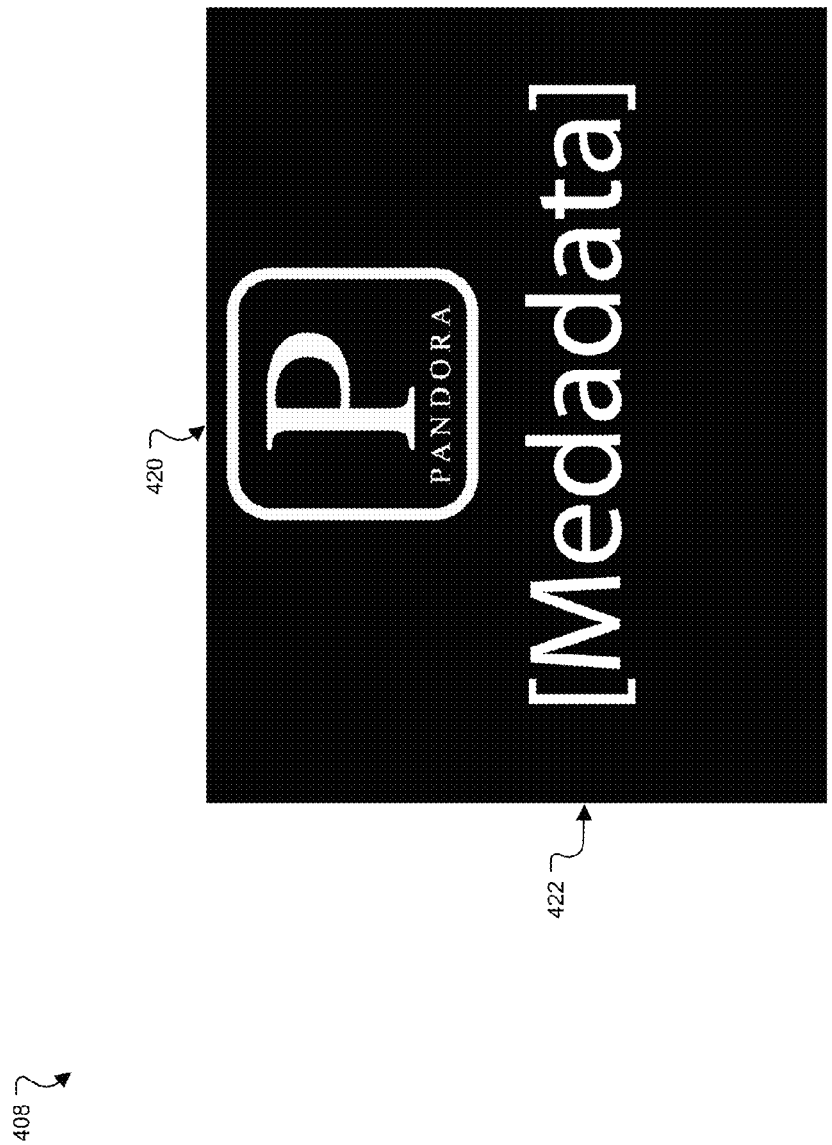
FIG. 4B is a screen shot from a display of the remote control device of FIG. 4A.

For example FIG. 4B illustrates an exemplary format for the display of an entity selected to provide audio content to the associated audio playback device. As shown in FIG. 4B, the display 408 may show information (e.g., an icon) 420 associated with an audio source (Pandora® in the illustrated example), along with text, e.g., metadata 422, associated with an entity associated with the audio source. For example, if the entity is an Internet radio station, then the displayed text may be the station name. If the entity is a user defined playlist, then the displayed text may be the playlist name. The entity may be an entity assigned to one of the presets, or an entity selected from the recents list for providing content for playback on the associated audio playback device.

As mentioned above, the remote control device 130c allows a user to browse presets and/or recents. In this regard, the remote control device 130c is configured to allow a user to preview the information associated with the entities via the display prior to selection of one of the entities for providing audio content for playback on the associated audio playback device, thereby allowing a user to view available entities before selecting one.

For example, in the presets mode, if a user wants to know which entity is assigned to a particular preset, the user can preview information about the assigned entity by touching the corresponding preset indicator 412 (without actuating the switch 416). In this regard, touching the preset indicator 412 will cause the remote control device 130c to display information (e.g., station name, playlist name) about the assigned entity on the display 408. An entity can be selected for playback on the associated audio playback device by pressing on the corresponding preset indicator 412.

Figure 5:
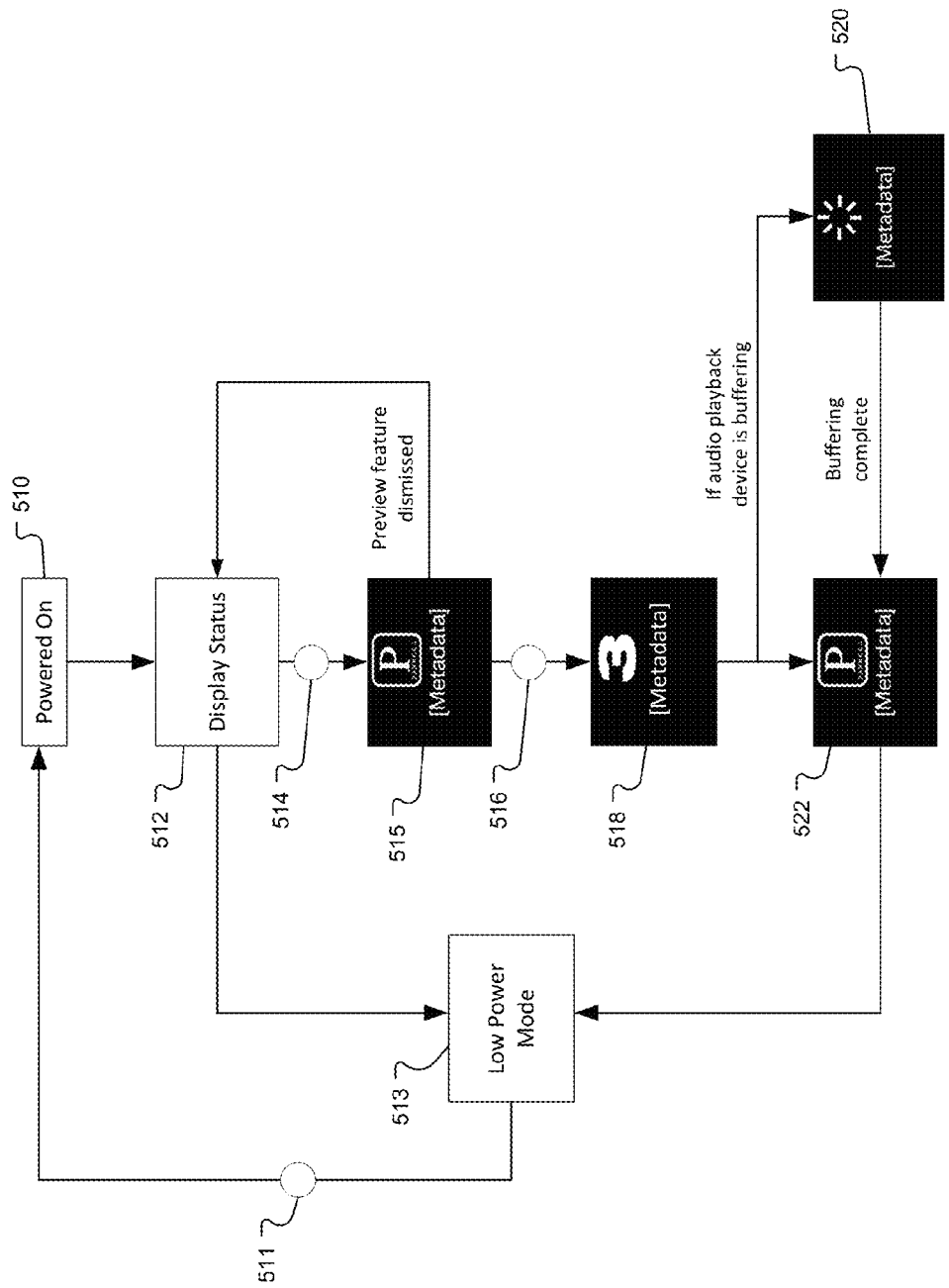
FIG. 5 is a process flow illustrating preview feature for previewing preset assignments on a remote control device.

Referring to FIG. 5, the remote control device 130c is powered on (510), e.g., triggered (511) to be powered on by the proximity sensor, and initially displays the status of the associated one of the audio playback devices (512). For example, if the associated audio playback device is currently playing content, the remote control device 130c can display information regarding the entity and audio source providing the currently playing audio content, which can be in the format illustrated in FIG. 4B. After a predetermined time (e.g., 5 seconds to 15 seconds) of inactivity, the remote control device 130c will return to the low power mode (513).

While the device 130c is in the powered on state, the user can browse presets by touching (514) the preset indicators 412. The remote control device 130c is configured to interpret input from the capacitive touch circuit 414 indicating a position of a user's finger relative to a first one of the preset indicators 412, in the absence of input indicating actuation of the switch 416, as a user request to preview information associated with the entity assigned to the first one of the preset indicators 412. In response to receiving input from the capacitive touch circuit 414 indicating a position of a user's finger relative to the first one of the preset indicators in the absence of input indicating actuation of the switch 416, the remote control device is configured to display, on its display 408, information associated with the entity assigned to the first one of the preset indicators (515). The information can include an identification of an audio source (e.g., an audio source icon) with which the assigned entity is associated, and metadata associated with the assigned entity. The user can simply preview the various preset assignments by moving their finger along the surface of the inner ring 404. If the user removes their finger from the inner ring 404 without making a selection, the preview feature will be dismissed and the remote control device 130c will simply return to the status display (512).

The user may select (516) one of the entities to provide content to the associated audio playback device by pressing down on the corresponding one of the preset indicators 412 with sufficient force to actuate the switch 416. The remote control device 130c is configured to interpret input from the capacitive touch circuit 414 indicating a position of a user's finger relative to the selected preset indicator 412 in combination with input indicating actuation of the switch 416 as selection of the entity assigned to the selected preset indicator 412 to provide audio content to the associated audio playback device.

In response to receiving input from the capacitive touch circuit 414 indicating a position of a user's finger relative to the first one of the preset indicators 412 in combination with input indicating actuation of the switch 416, the remote control device 130c is configured to send a command to the associated audio playback device instructing the associated audio playback device to play content from the entity assigned to the first one of the preset indicators 412. And, in response to receiving the command from the remote control device 130c, the associated audio playback device is configured to establish communication with the audio source with which the selected one of the entities is associated, thereby to receive streamed audio content from the selected one of the entities.

In response to receiving the input from the capacitive touch circuit 414 indicating a position of the user's finger relative to the first one of the preset indicators 412 in combination with input indicating actuation of the switch 416, the remote control device will also display, on its display 408, an indication that the corresponding preset has been selected (518). The indication can include a numerical identifier that is associated with the selected preset indicator, and metadata associated with the entity assigned to the corresponding preset. This indication will time out after a predetermined period (e.g., 750 milliseconds to 1 second), at which time the remote control device may display a buffering indication (520) if the associated audio playback device is buffering audio content from the selected entity. Once the associated audio playback device 130c begins rendering audio content from the selected entity, the remote control device 130c will display the information associated with the selected entity as the currently playing content (522).

The remote control device 130c will reenter the low power mode (513) after a predetermined period (e.g., 5 seconds to 15 second) of inactivity, and will remain in the low power mode until a triggering event (511) causes the device to be powered on (510) again.

Figure 6:
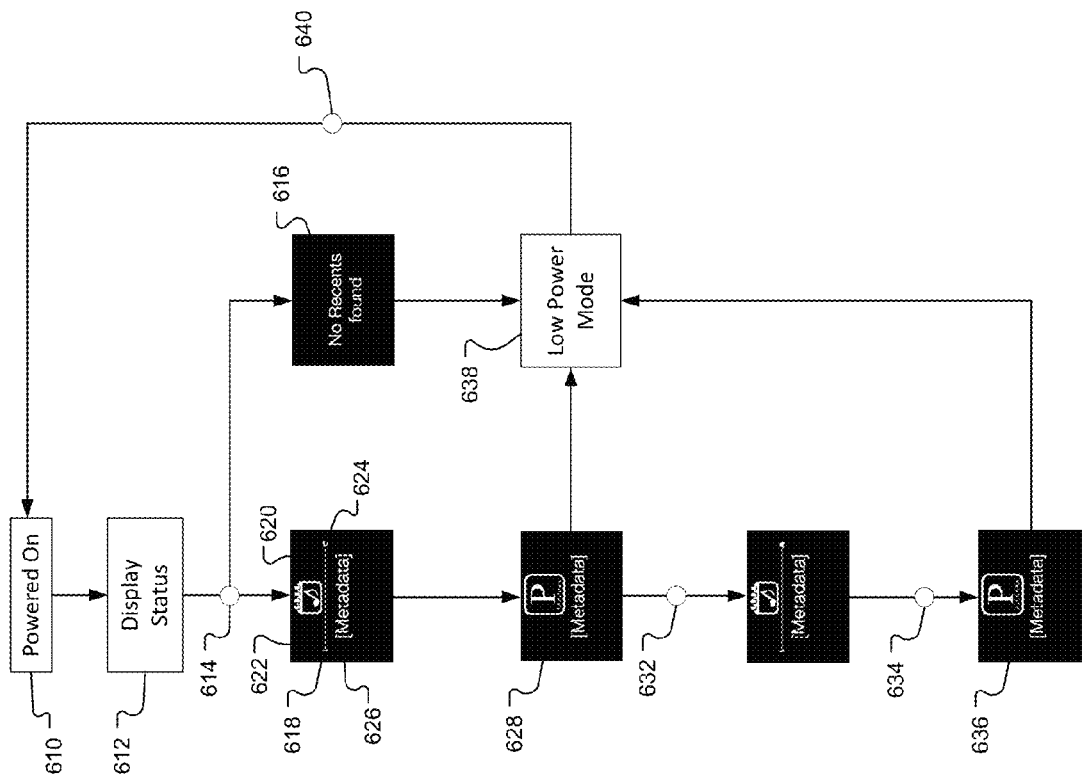
FIG. 6 is a process flow illustrating preview feature for previewing a recents list on a remote control device.

The user may also preview a recents list by swiping their finger along the surface of the inner ring 404 while in the recents mode. Referring to FIG. 6, the remote control device 130c is powered (610) and displays the status of the associated audio playback device (612). The user can switch to the recents mode by pressing the presets/recents modal button (614). If the recents list has not been populated, the remote control device 130c will display, on its display 408, an indication that no recents have been found (616). However, in the case that the recents list has been populated with recently accessed entities, the remote control device 130c will display a browse-able recents list. In this regard, the displayed information can include a recents list icon 620, an animated scroll bar 622 with a marker 624 that indicates relative position within the recents list, and metadata 626 for a corresponding one of the entities in the recents list. That is, the list is displayed one entity at a time. The user can scroll through the list by swiping their finger along the surface of the inner ring 404 (without actuating the switch 416). As the user swipes their finger to a different position a different entity will be displayed. The user can scroll down the recents list by swiping their finger counter-clockwise along the surface of the inner ring 404, and a can scroll up the recents list by swiping their finger in a clockwise motion along the surface of the inner ring 404. The marker 624 will move along the scroll bar 622 as the user swipes their finger in order to give the user a visual indication of where they are in the recents list.

After a first predetermined period (e.g., 2 seconds to 5 seconds) of inactivity, the remote control device 130c will display information associated with the most recently accessed entity on the recents list (628). This information can be displayed in the format described above with respect to FIG. 4B, The remote control device 130c will return to the low power mode after a second predetermined period (e.g., 5 seconds to 15 seconds) of inactivity (630). The user may return to the recents list by simply touching the surface of the inner ring before the expiry of the second predetermined period of inactivity (632).

A user may select an entity to provide audio content to the associated audio playback device from the recents list by scrolling to the corresponding position in the list and pressing the inner ring 404 with sufficient force to actuate the switch 416. The remote control device 130c is configured to interpret input from the capacitive touch circuit 414 indication a position of a user's finger relative to the inner ring 404 in combination with input indicating actuation of the switch 416 as selection of one of the entities from the recent list (634).

In response to receiving input from the capacitive touch circuit 414 indicating a position of a user's finger relative to the inner ring 404 in combination with input indicating actuation of the switch 416, the remote control device is configured to send a command to the associated audio playback device instructing the audio playback device to play content from the corresponding entity in the recents list. And, in response to receiving the command from the remote control device 130c, the associated audio playback device is configured to establish communication with the audio source with which the selected one of the entities is associated, thereby to receive streamed audio content from the selected one of the entities.

In response to receiving the input from the capacitive touch circuit 414 indicating a position of the user's finger relative to the inner ring 404 in combination with input indicating actuation of the switch 416, the remote control device will also display, on its display 408, the information associated with the selected entity (636).

The remote control device 130c will reenter the low power mode after a predetermined period (e.g., 5 seconds to 15 second) of inactivity (638), and will remain in the low power mode until a triggering event (640) causes the device to be powered on (610) again.

Notably, all of the content displayed on the remote control device 130c can be provided by the associated one of the playback devices in the form of rendered images. For example, the text for the display 408 can be rendered as an image on the associated playback device, and the audio playback device can then ship the pre-rendered images of the text to the remote control device 130c (e.g., via a Bluetooth LE link) for storage and display. This can provide the remote control device 130c with the appearance of having fancy display capabilities (such as true type font rendering ability, font scaling ability, and the ability to render different languages) even though it does not actually have those capabilities. Instead, the complex, heavy lifting (rendering, etc.) is performed on the associated audio playback device and ready to use graphics are then shipped to and stored on the remote control device 130c.

The preset assignments, recents list, and associated images on the remote control device are updated via communications with the associated audio playback device each time the remote control device is powered on. This can help to ensure that the information on the remote control device remains up to date. Additional details regarding the updating of the remote control device may be found in U.S. patent application Ser. No. 14/023,075, filed concurrently herewith, entitled "Remote Control Devices and Related Devices and Systems", inventors: Jonathan Christopher Sevigny et al., the entire contents of which are hereby incorporated by reference.

In some implementations, a user interface similar to the one illustrated in FIG. 4A can be incorporated into one of the audio playback devices. For example, FIG. 7 illustrates an audio playback device 700 that includes an enclosure 710 and on the enclosure 710 there resides a user interface that includes a plurality of concentrically arranged user interface elements. In the illustrated implementation, the user interface elements include a volume dial 720 (a/k/a volume ring); a top cover 722; an inner ring 724; a center button 726; and a display 728.

The volume ring 720 can be activated by rotating the volume ring 720 (e.g., clockwise to increase volume and counterclockwise to reduce volume) to adjust the volume of the audio playback device 700. The top cover 722 includes a plurality of discrete buttons which, in the illustrated example, are implemented as capacitive touch buttons 730a, 730b, 730c (collectively referenced as 730) each with a backlit icon 731a, 731b, 731c (collectively referenced as 731). Alternatively or additionally, the discrete buttons can comprise one or more hardware buttons (e.g., displaceable buttons for actuating associated switches). In the illustrated example, the capacitive touch buttons 730 include a presets/recents modal button 730a, a skip forward button 730b, and a skip back button 730c.

When in presets mode, the inner ring 724 serves as the absolute location of a plurality of preset indicators 732 (six shown). When in recents mode, a circular swiping motion along the inner ring 724 allows the user to browse the recents via the display 728, and select a recent, for playback on the audio playback device 700, by pressing down on the inner ring 724.

The center button 726 includes a circular lens that masks the display 728. A central push on the center button 726 can power on or pause and unpause the audio playback device's audio. A press-and-hold on the center button 726 shuts down the audio playback device 700.

A capacitive touch circuit 734 is positioned beneath the inner ring 724 and is utilized for sensing a position of a user's finger on the inner ring 724. The audio playback device 700 also includes a switch 736 (e.g., a snap dome switch) that is positioned beneath the center button 726 and display 728.

In the illustrated example, the inner ring 724 and the center button 726 are integrated in a common assembly an configured such that the switch 736 can be actuated by pressing centrally on the center button 726, or by pressing on the inner ring 724 (e.g., pressing on one of the preset indicators 732). The assembly is configured so that there is enough travel at the preset indicators 732 such that the switch 736 is always being actuated when one of the preset indicators 732 is pressed, and, such that, from a user's perspective, there is not a huge difference between the feel of hitting the center of the center button 726 or the preset indicators 732 along the edges.

When the user presses down on the inner ring 724, the user interface will receive input from the capacitive touch circuit 734 indicating the relative position of the user's finger on the inner ring 724 (e.g., which can be used to determine which one of the preset indicators 732 the user is pressing) in combination with input indicating the actuation of the switch 736. The user interface is configured to interpret actuation of the switch 736 in combination with input from the capacitive touch circuit 734 indicating a position of a user's finger on the inner ring 724 as selection of a preset, if the device is operating in the presets mode; or as selection of a recent, if the device is operating in the recents mode. In some cases, the user interface can include its own dedicated processor for interpreting user input. Alternatively, the user interface may utilize the audio playback device's processor for interpreting user input.

A central press on the center button 726 will also actuate the switch 736. The user interface is configured to interpret actuation of the switch 736, in the absence of input from the capacitive touch circuit 734 indicating a position of a user's finger on the inner ring, as selection of a function associated with the center button 726.

The user interface is also configured to interpret input from the capacitive touch circuit 734 indicating a position of a user's finger relative to the inner ring 724, in the absence of input indicating actuation of the switch 736, as a user request to preview information regarding one of the entities.

The user interface may also include a proximity detector for detecting the presence of a user's hand near the surface of the user interface. The proximity detector may include a proximity sensor 738 and a pair of infrared emitters 740 all mounted below the lens. The emitters 740 fire upward through the lens, and, when IR is reflected (e.g., off a user's hand reaching toward the audio playback device 700), the proximity sensor 738 picks that up. The proximity detector can be utilized to allow the user interface to "wake up" (i.e., power up) from a low power (a/k/a "sleep") mode.

The user interface may be configured to enter the low power mode (e.g., in which the display 728 and/or capacitive touch circuit 734 is powered off to conserve energy) after a predetermined period (e.g., 5 seconds to 15 seconds) of non-use. The proximity detector can then be utilized to trigger the user interface to power up from the low power mode when the presence of the user is detected.

The proximity detector functions such that the user interface wakes up (i.e., enters a normal power state, e.g., in which the one or functions that were deactivated when entering the low power mode are re-activated) when a user goes to use it without actually having to touch the user interface; i.e., so that the user's first contact with the user interface can be used for content (e.g., music) selection. In that regard, the proximity detector can also help to facilitate "one touch" access to music. The idea here is that the user's actions wake the user interface up from a sleep or low power mode before the user actually contacts the user interface so that the user can access content (e.g., music) with the user's first touch (e.g., by pressing one of the preset indicators 732, FIG. 7A).

The user interface of audio playback device 700 can function in the same manner as discussed above with respect to FIGS. 5 and 6 to allow a user to preview presets and recents via display 728 directly from the audio playback device 700.

A screen 742 conceals one or more electro-acoustic transducers (item 215, FIG. 2C). The audio playback device 700 also includes a network interface, a processor, memory, and audio hardware such as described above with reference to FIG. 2C.

Figure 7A:
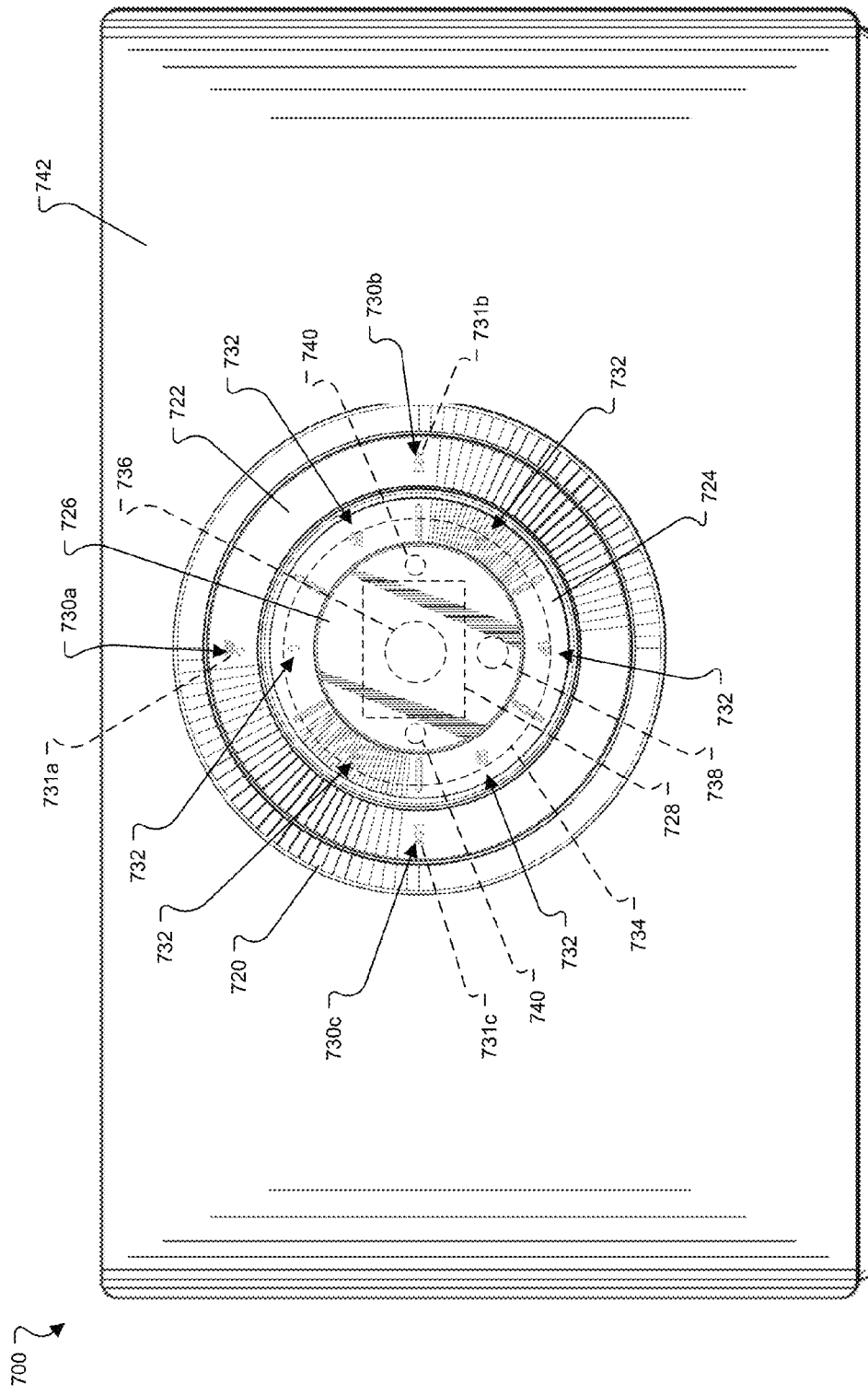
FIGS. 7A and 7B are front elevation and top plan views, respectively, of another implementation of an audio playback device having an alternative user interface.
Figure 7B:
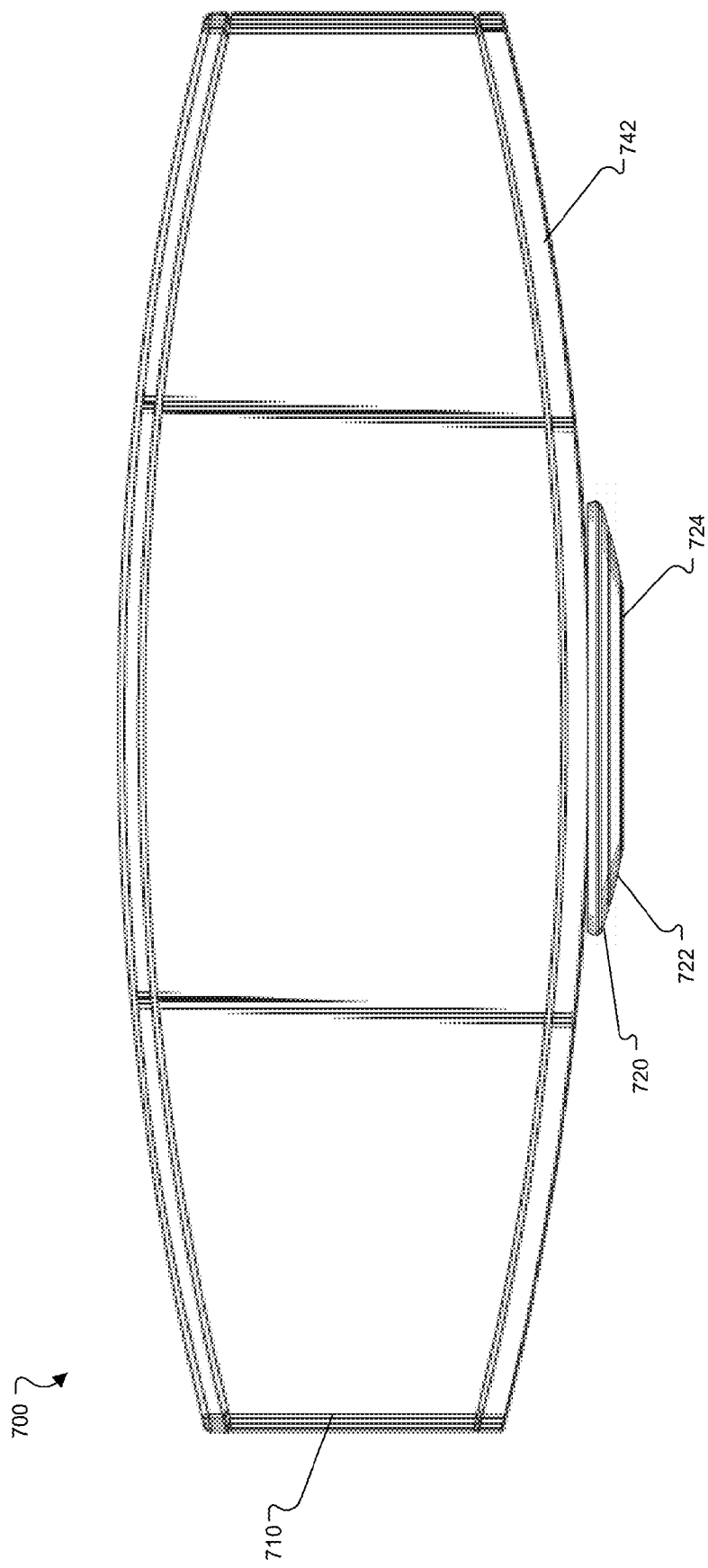

While FIGS. 7A and 7B illustrate an implementation of the audio playback device that includes the user interface on a front surface of the device, in some implementations, the user interface may alternatively be positioned on the top surface of the device.

A number of implementations have been described. Nevertheless, it will be understood that additional modifications may be made without departing from the scope of the inventive concepts described herein, and, accordingly, other implementations are within the scope of the following claims.

What is claimed is:

1. A user interface for controlling an audio playback device, the user interface comprising:
    an input region operable to select from a plurality of entities for providing audio content to the audio playback device; and
    a display for displaying information associated with the entities,
    wherein the user interface is configured to allow a user to preview the information associated with the entities via the display prior to selection of one of the entities for providing audio content for playback on the audio playback device,
    wherein the user interface is operable in a presets mode and a recents mode,
    wherein, when the user interface is in the presets mode, the input region operates as an absolute location of a plurality of preset indicators, which correspond to a set of preset indicators on the audio playback device, each indicator in the set of preset indicators is configured to have assigned to it one of the entities, and a user can preview information associated with an assigned one of the entities via the display by touching a corresponding one of the preset indicators, and
    wherein, when the user interface is in the recents mode, a swiping motion along the input region allows a user to preview a recents list, wherein the recents list is a list of entities that is populated from content that the user has chosen to play on the audio playback device.

2. The user interface of claim 1, wherein the information associated with the entities comprises an identification of an audio source associated with a corresponding one of the entities, and metadata associated with the corresponding one of the entities.

3. The user interface of claim 2, wherein the identification of the audio source comprises an icon associated with the audio source.

4. The user interface of claim 1, wherein the input region comprises a finger position sensor for sensing a position of a user's finger on a surface of the input region.

5. The user interface of claim 4, further comprising a switch,
    wherein the input region is spatially displaceable to actuate the switch,
    wherein the user interface is configured to interpret input from the finger position sensor indicating a position of a user's finger relative to the input region as a user request to preview information regarding one of the entities in the absence of input indicating actuation of the switch, and
    wherein the user interface is configured to interpret input from the finger position sensor indicating a position of a user's finger relative to the input region in combination with input indicating actuation of the switch as selection of one of the entities to provide audio content to the audio playback device.

6. The user interface of claim 4, wherein the input region operates as an absolute location of a plurality of preset indicators, wherein each indicator in the set of preset indicators is assigned to it one of the entities.

7. The user interface of claim 4, further comprising a switch,
    wherein the input region is spatially displaceable to actuate the switch,
    wherein the user interface is configured to interpret input from the finger position sensor indicating a position of a user's finger relative to a first one of the preset indicators as a user request to preview information associated with the entity assigned to the first one of the preset indicators in the absence of input indicating actuation of the switch, and
    wherein the user interface is configured to interpret input from the finger position sensor indicating a position of a user's finger relative to the first one of the preset indicators in combination with input indicating actuation of the switch as selection of the entity assigned to the first one of the preset indicators to provide audio content to the audio playback device.

8. The user interface of claim 4, wherein a swiping motion along the input region allows a user to preview a recents list, wherein the recents list comprises a list of entities that is populated from content that the user has chosen to play on the audio playback device.

9. The user interface of claim 8, further comprising a switch,
    wherein the input region is spatially displaceable to actuate the switch,
    wherein the user interface is configured to interpret input from the finger position sensor indicating a position of a user's finger relative to the input region as a user request to preview information regarding one of the entities from the recents list in the absence of input indicating actuation of the switch, and
    wherein the user interface is configured to interpret input from the finger position sensor indication a position of a user's finger relative to the input region in combination with input from the finger position sensor as selection of one of the entities from the recent list.

10. The user interface of claim 1, wherein the entities comprise at least (i) user-defined playlists of digital music and (ii) Internet radio stations.

11. A remote control device comprising the user interface of claim 1.

12. The remote control device of claim 11, wherein the input region operates as an absolute location of a plurality of preset indicators, wherein each indicator in the set of preset indicators is assigned to it one of the entities.

13. The remote control device of claim 12, wherein the preset indicators on the user interface correspond to a set of preset indicators on the audio playback device.

14. The remote control device of claim 11, wherein the remote control device is not configured to stream audio content to the audio playback device.

15. An audio playback device comprising the user interface of claim 1.

16. A system comprising:
    A. a remote control device comprising a user interface for controlling an audio playback device, the user interface comprising:
        i. an input region operable to select from a plurality of entities for providing audio content to the audio playback device, and
        ii. a display for displaying information associated with the entities,
        wherein the user interface is configured to allow a user to preview the information associated with the entities via the display prior to selection of one of the entities for providing audio content for playback on the audio playback device; and B. an audio playback device configured to operably connect to a plurality of digital audio sources, the audio playback device comprising:
   i. a digital-to-analog converter configured to receive a digital representation of content from the digital audio sources and convert to analog form; and
   ii. an electro-acoustic transducer,
wherein the remote control device is configured to send a command to the audio playback device instructing the associated audio playback device to render audio content from a selected one of a plurality of entities associated with the plurality of digital audio sources, and
wherein, in response to receiving the command from the remote control device, the audio playback device is configured to establish communication with an audio source associated with the selected one of the entities, to receive streamed audio content from the selected one of the entities.

17. The system of claim 16, wherein the input region operates as an absolute location of a plurality of preset indicators, wherein each indicator in the set of preset indicators is assigned to it one of the entities.

18. The system of claim 17, wherein the audio playback device comprises a plurality of preset indicators, wherein each indicator in the set of preset indicators of the audio playback device is assigned to it one of the entities, and wherein the preset indicators on the remote control device correspond to the preset indicators on the audio playback device.

19. The system of claim 17, wherein the preset indicators of the remote control device are disposed circumferentially around the display.

20. A user interface for controlling an audio playback device, the user interface comprising:
   a plurality of concentrically arranged user interface elements comprising:
      a center button comprising a display;
      an inner ring circumferentially surrounding the center button and operable to select from a plurality of entities for providing audio content to the audio playback device;
      a middle ring circumferentially surrounding the inner ring and comprising a plurality of discrete buttons; and
      a volume ring circumferentially surrounding the middle ring and operable to adjust the audio volume of the audio playback device,
   wherein the user interface is configured to allow a user to preview the information associated with the entities via the display prior to selection of one of the entities for providing audio content for playback on the audio playback device,
   wherein the inner ring comprises a finger position sensor for sensing a position of a user's finger on a surface of the ring.

21. The user interface of claim 20, wherein the plurality of discrete buttons comprise a plurality of capacitive touch buttons.

22. The user interface of claim 21, wherein the plurality of discrete buttons comprise a skip forward button and a skip back button.

23. The user interface of claim 20, wherein the finger position sensor comprises a capacitive touch circuit.

24. The user interface of claim 20, wherein the center button is displaceable to actuate a switch, and wherein the user interface is configured to interpret input from the finger position sensor indicating a position of a user's finger relative to the inner ring as a user request to preview information regarding one of the entities in the absence of input indicating actuation of the switch, and
   wherein the user interface is configured to interpret input from the finger position sensor indicating a position of a user's finger relative to the inner ring in combination with input indicating actuation of the switch as selection of one of the entities to provide audio content to the audio playback device.

25. The user interface of claim 24, wherein, in response to receiving input from the finger position sensor indicating a position of a user's finger relative to the inner ring in combination with input indicating actuation of the switch, the user interface is configured to instruct the audio playback device to play content from a selected one of the entities.

* * * * *